United States Patent [19]
Reed et al.

[11] 3,803,763
[45] Apr. 16, 1974

[54] ONE-WAY DEER GATE

[75] Inventors: Dale F. Reed, Glenwood Springs; Jerome J. Cebula, Golden, both of Colo.

[73] Assignee: The State of Colorado, Department of Natural Resources, Division of Wildlife, Denver, Colo.

[22] Filed: Dec. 13, 1972

[21] Appl. No.: 314,707

[52] U.S. Cl............................. 49/49, 49/9, 49/58
[51] Int. Cl.............................................. E06 11/00
[58] Field of Search........ 49/9, 34, 49, 58; 119/155, 119/16, 27

[56] References Cited
UNITED STATES PATENTS
| | | | |
|---|---|---|---|
| 2,691,231 | 10/1954 | Cook | 49/49 |
| 557,870 | 4/1896 | Parker | 287/49 |
| 428,905 | 5/1890 | Guerra | 49/49 |

*Primary Examiner*—J. Karl Bell
*Attorney, Agent, or Firm*—Bertha L. MacGregor

[57] ABSTRACT

A one-way deer gate for easy passage of deer in one direction through the gate and for prevention of passage in the opposite direction comprises opposite side frame bars and upper and lower horizontal frame bars. The side bars have connected thereto a plurality of resilient spring steel tines, the tines of each side converging toward those of the other side, and extending outwardly from the gate to provide between the tine ends a transversely narrow opening at a distance from the face of the gate. Additional tines extend outwardly from the upper and lower frame bars and limit the height of the narrow opening between the ends of the side bar tines. The combined side, upper and lower tines form a funnel shaped opening through which deer gain entry for passage through the gate in one direction. The tines flex to permit passage of deer in the intended direction, but prevent passage in the opposite direction. Wedge members limit movement of the side tines under undue side pressure on the tines.

6 Claims, 4 Drawing Figures

PATENTED APR 16 1974 3,803,763

ONE-WAY DEER GATE

This invention relates to a one-way deer gate designed for installation in a fence surrounding a paddock or in a fence adjacent highway right of way.

The main object of the invention is to provide a one-way deer gate that prevents deer from passing through the gate in one direction but permits easy passage in the opposite direction, without inconvenience or harm to the animals.

The one-way deer gate of our invention has a plurality of outwardly directed spring steel tines mounted in side bars at each side of the gate, together with upper and lower tines connected respectively to upper and lower frame bars between said side bars, the combined tines forming a funnel shaped opening in the gate that is inviting for entry by the deer and passage between the tines in one direction. The outer ends of the tines define a transversely narrow opening, limited also as the height, but the tines are sufficiently flexible and resilient to permit easy passage through said opening in the intended direction. Passage in the opposite direction is prevented by the ends of the converging side tines together with the upper and lower tines encountered by the deer attempting to pass in the direction.

Another object is to prevent unitended pivotal movement of the side bars on which the side tines are mounted. Undue side pressure against the inner sides of the tines is thus resisted by the provision of wedge means between the side bars at each side of the gate.

Figure 1:
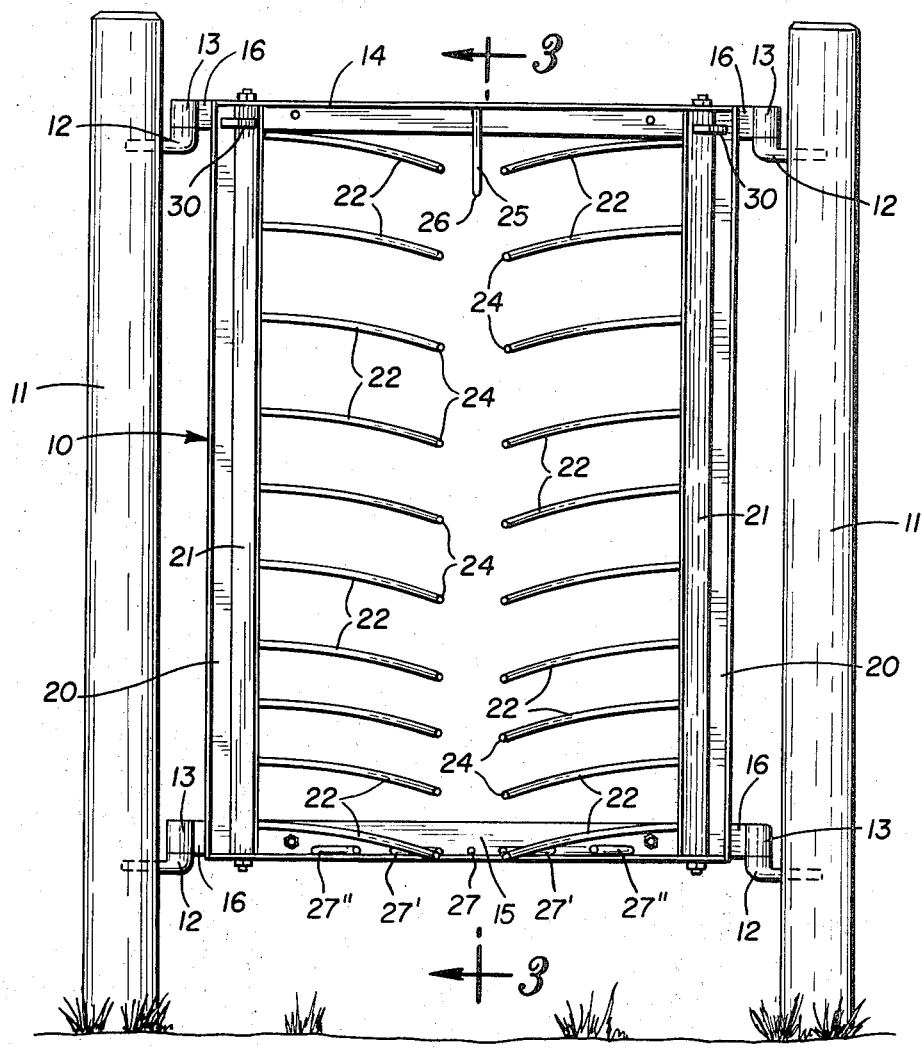
FIG. 1 is an elevational front view of a one-way deer gate embodying our invention.

In the embodiment of the invention shown in the drawings, the deer gate indicated as a whole by the numeral 10 is shown mounted on and between posts 11 by brackets 12 on which the gate is hung by sleeves 13 connected to the upper and lower frame angle bars 14 and 15, respectively. A hinge strap 16 is fastened to the upper and lower frames 14, 15, to provide a hinge 17 at one side of the gate.

Figure 2:
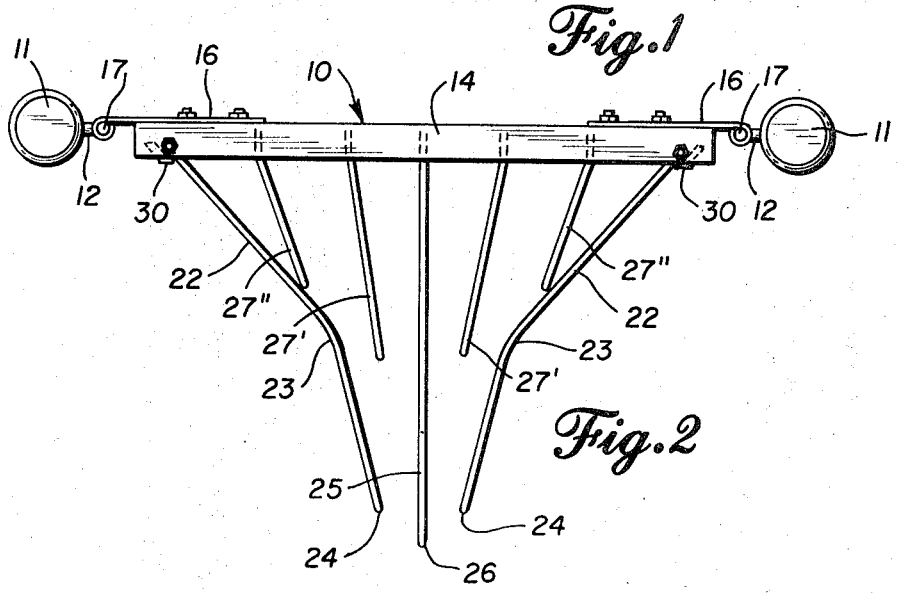
FIG. 2 is a top plan view of the same.

The gate side frames comprise vertical angle bars 20, 21, at each side, connected to the top and bottom bars 14, 15. A plurality of tines 22 made of spring steel marketed under the name "Bailer" tines are mounted at one end in the side bars 21. Preferably the tines in the upper third of the gate are spaced apart vertically a greater distance than the tines in the middle third, and the latter are spaced apart a greater distance than those in the lower third of the gate height. For example, in the gate shown in the drawings, 10 tines 22 are mounted in each side of the gate, the upper three of each side being spaced apart, vertically, 6 inches; the next lower three tines on each side are spaced apart, vertically, 5 inches; and the lower four tines on each side are spaced apart, vertically, 4 inches. The shape of the tines 22 is best shown in the top view, FIG. 2, where the tines on opposite sides of the gate incline slightly downwardly and converge at approximately 45 degrees for about two thirds of their length to the curve 23, and then converge at a lesser angle to their ends 24. The ends 24 of the right and left tines 22 are spaced apart approximately 5 inches.

Figure 3:
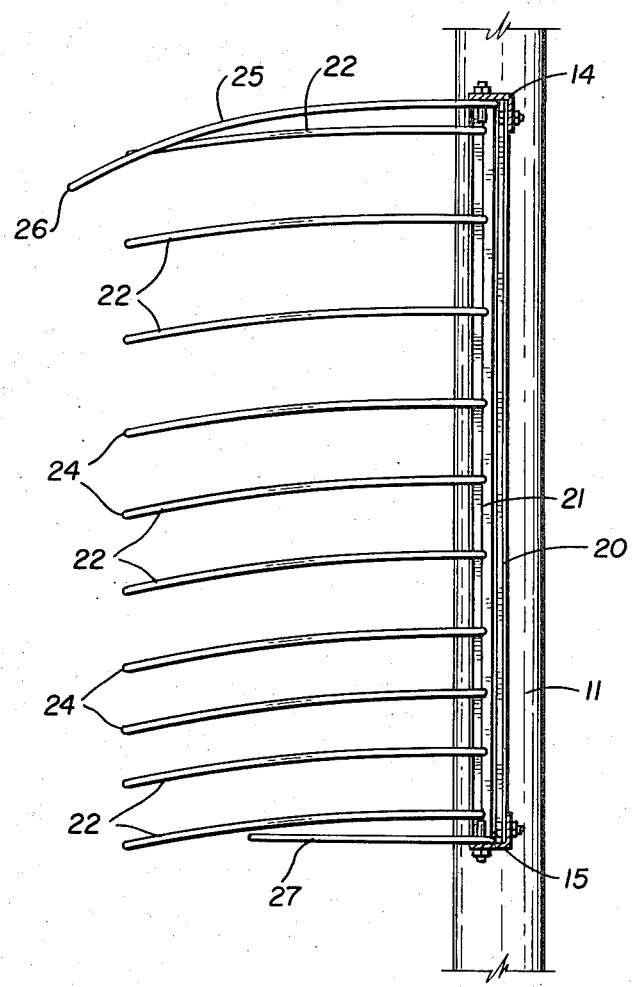
FIG. 3 is a transverse vertical sectional view in the plane of the line 3—3 of FIG. 1.
Figure 4:
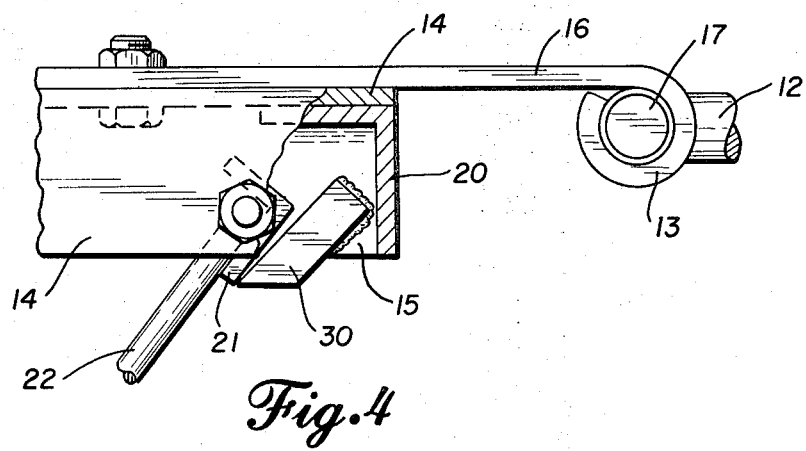
FIG. 4 is an elevational top view, partly in section, showing a detail of construction, particularly the tine mounting and stop wedge.

Attached to the upper frame angle bar 14 is a single tine 25 which curves gradually downwardly from the center of the frame bar 14 to its end 26 as shown in FIG. 3. Five tines 27 are fastened to the lower frame bar 15, the center tine 27 being longer than the adjacent tines 27' on each side, and the latter being longer than the outermost bottom tines 27''.

The combined side tines 22, upper tine 25 and lower tines 27, 27' and 27'', all directed outwardly from one side of the gate, provide a funnel shaped opening for deer passing through the gate in one direction. The limited opening afforded between the ends 24 of the side tines 22 as well as the obstacles presented by the outer ends of the upper tine 25 and lower tines 27 prevent passage of deer in the opposite direction. The resiliency of the tines as well as their initial forms facilitate passage in the intended direction without inconvenience or harm to the deer, while discouraging and preventing passage in the opposite direction.

The side frame bars 21 have limited swinging motion when pressure tending to separate the tines 22 of opposite side is imposed on the tines, but the wedge block 30 attached to the angle bar 14 prevents unintended pivotal movement of the bar 21.

We claim:

1. A one-way deer gate which permits passage of animals in one direction through the gate and prevents passage in the opposite direction comprising
   a. a frame consisting of side, top and bottom bars connected together, mounted on and between posts of a fence, said side, top and bottom bars defining a passage opening for animals,
   b. a plurality of resilient tines each directly connected at one end to a side bar of the frame, the tines on each of said side bars extending outwardly relatively to said passage opening and toward the tines on the other side bar and defining a narrow opening between the ends of the tines of opposite side bars at a distance outwardly of the frame, and c. aeditional resilient tines directly connected at one end of each tine to the top and bottom frame bars, said side, top and bottom tines defining a funnel shaped passage having its larger opening in the plane of the frame bars and its smaller opening between the ends of the tines, said tines flexing between their ends to enlarge said funnel shaped passage when an animal passes through said passage and automatically flexing to return to normal positions after passage of an animal through said passage.

2. The gate defined by claim 1, in which a plurality of tines at each side nearest the bottom frame bar are spaced apart from each other a lesser distance than the tines above them.

3. The gate defined by claim 1, in which the tines which extend outwardly from the bottom frame bar are horizontal, the centrally located tine being longer than the tines nearest the sides of the gate.

4. The gate defined by claim 1, in which the tine which extends outwardly from the top frame bar is slightly curved downwardly near its end and said end extends outwardly beyond the ends of the tines on the side bars.

5. The gate defined by claim 1, in which the frame includes a pair of side angle bars at each side, and includes a wedge member attached to one of said angle bars at each side to limit movement of the bars to which the side tines are connected.

6. A one-way deer gate which permits passage of deer in one direction through the gate and prevents passage in the opposite direction comprising
   a. a frame consisting of top and bottom angle bars, two side bars rigidly connected to the top and bottom angle bars, and two inner side bars pivotally connected to said top and bottom angle bars, said frame being hingedly connected to posts of a fence,
   b. a plurality of spring metal tines directly connected to each of the inner side bars and extending outwardly from the gate in converging directions to a narrow opening between the ends of the tines,
   c. a centrally located tine on the upper frame bar extending outwardly from the gate beyond the ends of the tines connected to the side bars, and
   d. a plurality of tines connected to the bottom angle bar extending outwardly from the bar,
   said upper, lower and side tines forming a funnel shaped opening extending from the gate frame outwardly toward the ends of the tines which define a transversely narrow opening between the ends of the side tines limited in height by the upper and lower tines, to permit passage of deer through said funnel shaped opening by flexing of the side tines.

* * * * *